United States Patent [19]
Parrack

[11] 3,952,281

[45] Apr. 20, 1976

[54] METHOD OF MARINE REFLECTION-TYPE SEISMIC EXPLORATION

[75] Inventor: Alvin L. Parrack, Bellaire, Tex.

[73] Assignee: Texaco Inc., New York, N.Y.

[22] Filed: June 10, 1974

[21] Appl. No.: 477,554

Related U.S. Application Data

[63] Continuation of Ser. No. 309,315, Nov. 24, 1972, abandoned.

[52] U.S. Cl............................ 340/7 R; 340/15.5 MC; 181/112
[51] Int. Cl.²......................................... G01V 1/38
[58] Field of Search............ 340/7 R, 18 NC, 18 LD, 340/3 FM, 15.5 MC, 4 A, 43 T; 181/112

[56] References Cited
UNITED STATES PATENTS

| | | | |
|---|---|---|---|
| 2,757,356 | 7/1956 | Haggerty | 340/7 R |
| 3,705,381 | 12/1972 | Pipkin | 340/3 FM |
| 3,716,830 | 2/1973 | Garcia | 340/18 LD |

FOREIGN PATENTS OR APPLICATIONS

| | | | |
|---|---|---|---|
| 1,193,507 | 6/1970 | United Kingdom | 340/7 R |

Primary Examiner—T. H. Tubbesing
Assistant Examiner—N. Moskowitz
Attorney, Agent, or Firm—T. H. Whaley; C. G. Ries; Henry C. Dearborn

[57] ABSTRACT

Seismic exploration method applicable to marine surveys. It involves making a dual spread of detectors which are spaced apart vertically. The signals received at the uppermost spread are delayed sufficiently to make downgoing energy signals in time coincidence with downgoing energy signals from the lower spread. Then the signals from both spreads are algebraically combined so as to cancel downgoing energy signals only.

4 Claims, 6 Drawing Figures

METHOD OF MARINE REFLECTION-TYPE SEISMIC EXPLORATION

This is a continuation of application Ser. No. 309,315, filed Nov. 24, 1972, now abandoned.

BACKGROUND OF THE INVENTION

1. Field of the Invention

This invention relates to seismic exploration in general. More specifically, it concerns an improved method of reflection-type seismic exploration that is particularly applicable to marine operations.

2. Description of the Prior Art

It has been known for quite some time that in marine seismic operations, there are particular problems that are not encountered in land operations. One aspect stems from the fact that in marine operations the seismic detectors placed below the surface of the water are sensitive to seismic waves in the water regardless of their direction of travel. Furthermore, pressure-type detectors are usually used, whereas in land operations the detectors are ordinarily a displacements or inertia type.

Heretofore, in marine operations, seismic waves were often generated by detonation of an explosive charge which was usually placed at a depth of ten feet or less below the surface. This avoided interference produced by the phenomenon commonly called "bubble bounce" which interference is generated by charges fired at greater depth. The shallow depth of charge also would avoid the problem of ghost reflections which are encountered in land-type shooting where the charge is detonated in competent earth material some distance below a good reflector.

However, the additional problem remained in offshore seismic exploration which was created by the vertically travelling reflection signals that will reflect back down from the surface of the body of water and, consequently, will create an interference pattern.

Consequently, it is an object of this invention to provide an improved method of marine-type seismic surveying. Furthermore, another object is to provide a method of marine-type seismic exploration which greatly simplifies the procedure for elimination of undesirable seismic wave energies from a recording.

Another object of the invention is to provide a marine reflection-type seismic method for creating a record which is independent of depth of the detectors in the water and free of down-going signals.

SUMMARY OF THE INVENTION

Briefly, the invention concerns marine reflection-type seismic exploration. It concerns a method for improving the character of recorded data which is developed from seismic detectors located in a body of water. The method comprises the steps of locating at least two of said detectors spaced vertically apart in said body of water, and delaying the signals from the uppermost one of said detectors, in order to have the signal created by down-going energy which is reflected from the surface of said body of water, delayed into time coincidence with the downgoing energy signals from the lowermost detector. It also comprises the step of algebraically combining the signals from said spaced detectors after said delay in order to cancel said downgoing energy signals.

Again, briefly, the invention concerns marine reflection-type seismic exploration, and it provides a method for improving the character of recorded data developed from seismic detectors located in a body of water. The method comprises creating a source of seismic energy in said body of water, and locating at least two of said detectors spaced vertically apart in said body of water at a predetermined range from said source. It also comprises reproducibly recording the seismic energy received at each of said detectors separately, and delaying the seismic energy reproduced from the uppermost of said detectors relative to the corresponding energy reproduced from the lowermost, in order to adjust the downgoing energies from both into time coincidence. It also comprises subtracting said delayed reproduced energy from said other reproduced energy in order to cancel out said downgoing energies.

BRIEF DESCRIPTION OF THE DRAWINGS

The foregoing and other objects and benefits of the invention will be more fully set forth below in connection with the best mode contemplated by the inventor, and in connection with which there are illustrations provided in the drawings, wherein.

DESCRIPTION OF THE PREFERRED EMBODIMENTS

Figure 1:
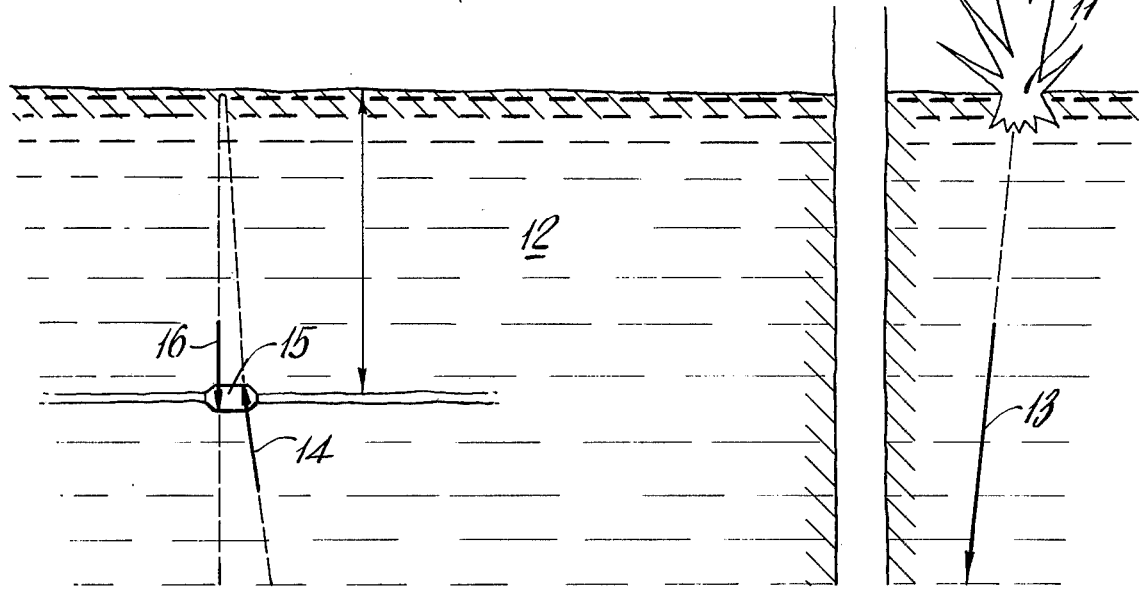
FIG. 1 is a schematic cross-sectional view illustrating a marine-type seismic operation according to the prior art.

Referring to FIG. 1, it will be appreciated by those skilled in the art that in known marine seismic reflection-type operations the seismic energy may be created by an explosive charge 11 near the surface of a body of water 12. The vertically travelling seismic waves will go through the water downward into subsurface formations, as indicated by a ray path 13 shown. Then, whenever reflecting interfaces are encountered in the subsurface beneath, some of the energy will be reflected back up and appear in the body of water 12, as indicated by another ray path 14. The seismic waves travelling along this path will cause signals to be developed by a marine pressure-type detector 15. However, the energy travelling upward will continue past the detector 15 and then be reflected back downward from the surface of the body of water 12. This is indicated by another ray path 16. It will be understood that this downwardly reflected energy tends to cause an interference signal since it arrives at the detector 15 only a short time after the upwardly travelling reflected energy of ray path 14 that preceded it. Furthermore, any succeeding upward-travelling reflections from deeper subsurface interfaces might arrive about the same time as the downward-travelling waves.

Figure 2:
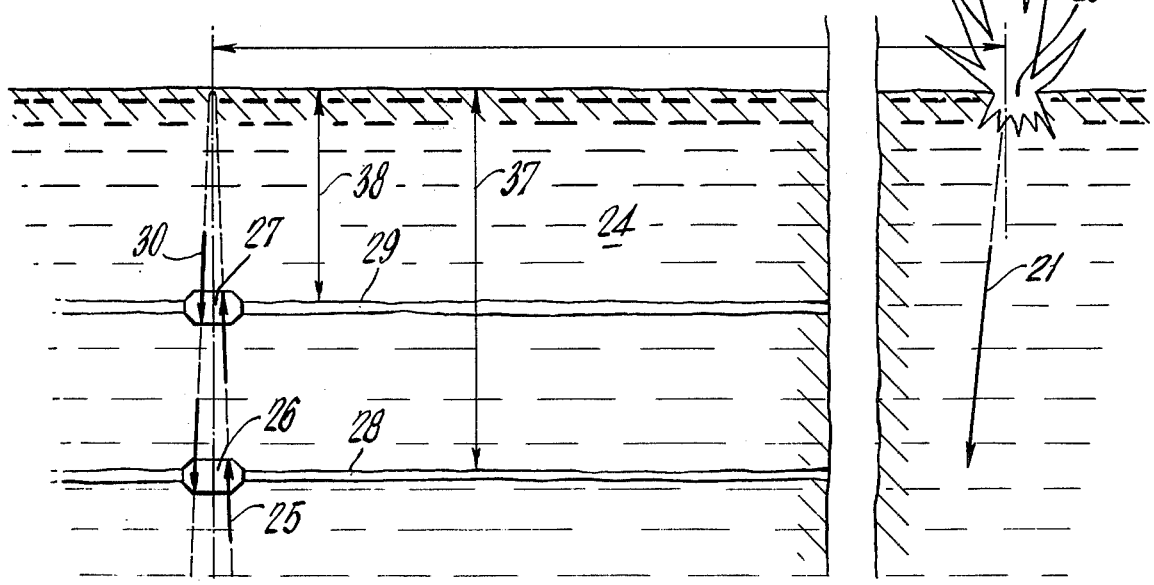
FIG. 2 is a schematic cross-sectional showing illustrating the basic elements of a marine operation according to this invention.

Referring to FIG. 2, it is pointed out that a method according to this inventon is illustrated. There is a source of seismic energy, e.g., an explosive charge 20, that will create downward-travelling seismic waves, as indicated by a ray path 21. Then, as before, the subsurface reflected upward-travelling energies from subsurface interfaces will travel vertically upward through a body of water 24 and arrive at a first detector 26 over a ray path 25. Detector 26 is located vertically beneath a second detector 27, each of which is connected to a plurality of other detectors (not shown) by means of cables 28 and 29, respectively, in the usual manner. The upward-travelling seismic waves along ray path 25 will next encounter the second detector 27, and thereafter, the energy will be reflected back down from the surface of the body of water 24 via a ray path 30. Such downward-travelling waves will first encounter the detector 27 and, thereafter, the lowermost detector 26. As will be explained in greater detail below, the use of the two vertically spaced detectors 26 and 27 enables the carrying out of a method according to this invention which provides cancellation of downgoing seismic wave signals so as to eliminate the interference pattern that would otherwise be created.

Figure 3:
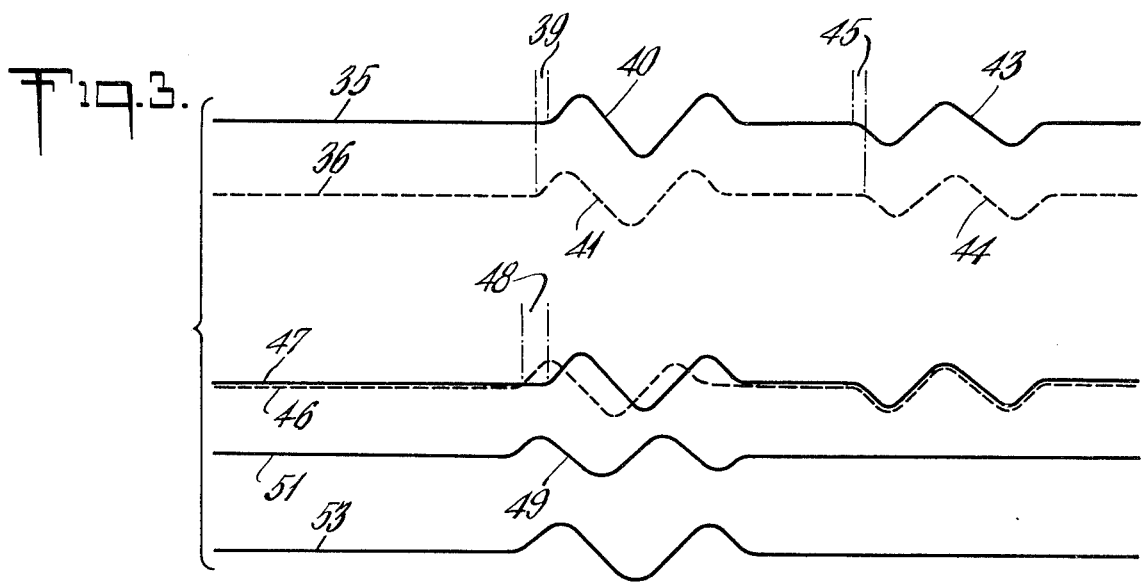
FIG. 3 is a diagramatic showing of idealized waveform signals for illustrating the invention.

FIG. 3 illustrates idealized seismic wave signals 35 and 36. These represent signals which might be created by detectors 27 and 26, respectively, of the FIG. 2 illustration, as a seismic wave travelling over the ray paths 25 and 30 impinged upon them. It will be observed from FIG. 3 that there is a time difference 39 between the first arrivals of upgoing waves 40 and 41. And, from the foregoing explanation with reference to FIG. 2, it will be appreciated that such time difference represents the length of time it takes for the seismic waves to travel the vertical distance that detectors 26 and 27 are separated.

In other words, a reflection from the interface between two formations of the subsurface will be received first at detector 26 as the wave 41 at a depth 37 (see FIG. 2). Then it will be received at detector 27 as the wave 40 at a depth 38. Thus, the wave 40 lags behind the wave 41 by a time 39 which is equal to the depth 37 minus the depth 38 divided by the velocity of the seismic waves in the water 24. And, it is well established that the same time lag exists between downward-travelling seismic waves although the order of arrival will be reversed. This is illustrated in FIGS. 2 and 3 where the signals generated by detector 26 are indicated by reference number 36 and are illustrated in dashed lines, while the signals from detector 27 are indicated by reference number 35 and are shown in full line.

After the energy travelling upward has been reflected back down from the surface of the body of water 24, the first seismic wave will be that indicated by reference number 43 (FIG. 3) which is generated by detector 27. Thereafter, the detector 26 will generate a corresponding wave 44 as the downgoing energy reaches it. It will be noted that this time lag is indicated by a reference number 45 and it represents the difference between first arrivals of downgoing energy at the two detectors. As stated above, this time lag 45 is equal to the other time lag 39.

It will be appreciated that the example being described with illustrations represents a simplified case, and it considers signals reflected from only one horizon. However, the principles remain the same in more complex situations. Also, the difference between depth 37 and depth 38 will be quite small compared to the total distance from the charge 20 down to a reflecting horizon (not shown) and back, so that there is a very minor change in the amplitude and shape of the signal as it travels from detector 27 to detector 26.

According to the invention, the elimination of downgoing energy signals is accomplished by introducing a delay of the signals from the uppermost detector 27 that equals the time lag 45. This will cause relative time shifting of the waves 40–41 and 43–44 so that they have the relationship illustrated by the superimposing of signals 46 and 47 which correspond to the signals 36 (dashed line) and 35 (full line), respectively, as indicated on the third line of wave-form showings in FIG. 3. It will be noted that this results in a time difference 48 for the waves 40 and 41 which is twice as long as either the times 39 or 45 because the entire signal 35 is delayed.

After the delay has been introduced, one of the signals 46 or 47 is subtracted from the other to eliminate the waves 43 and 44 (downgoing) while retaining a resulting wave 49 (combined upgoing), which is illustrated as part of a resultant signal 51. Then, by integrating the resultant signals 51 from a detector spread, the desired wave form may be improved as illustrated by a signal 53.

Figure 4:
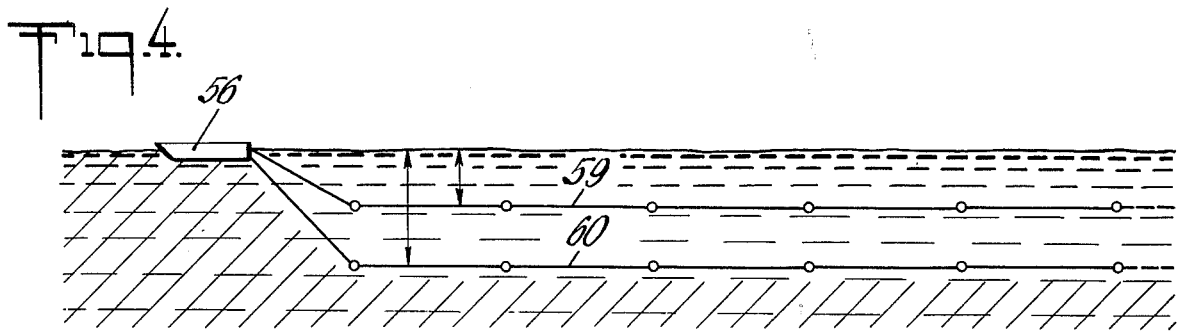
FIG. 4 is a schematic cross-sectional view illustrating a marine-type seismic detector spread according to the invention.

In FIG. 4, there is a schematic showing to indicate the vertically displaced detector spreads that are employed to carry out the invention. Thus, there is a boat 56 from which there are two spreads 59 and 60. These spreads each have a plurality of individual detector locations, as indicated, and the spread 60 is located vertically spaced beneath the spread 59. Individual detectors are located at common ranges for the corresponding ones in each spread.

It is to be understood that recording equipment will be located on the boat 56. Also, various arrangements may be made for creating the seismic energy that will be picked up by the detectors in the spreads 59 and 60. For example, a charge of explosive may be detonated near the surface at a predetermined range horizontally from the spread as was indicated in the descriptions relating to FIGS. 1 and 2. Of course, other types of seismic energy source may be employed, such as compressed-air guns, or the like.

Figure 5:
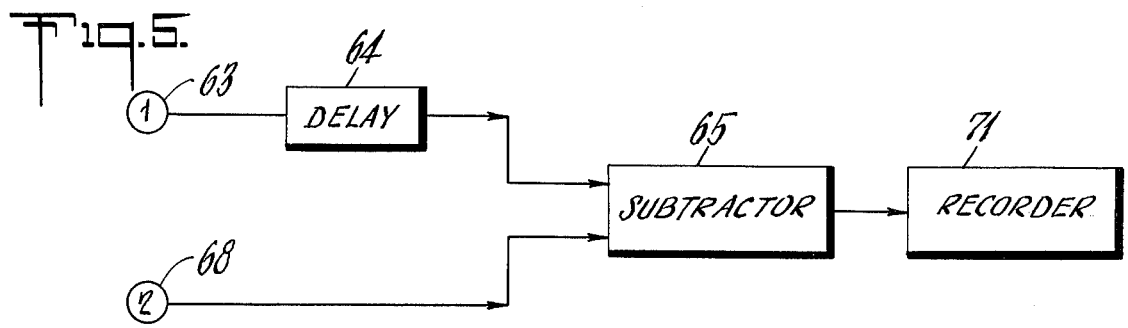
FIGS. 5 and 6 are block-diagram illustrations showing two modifications, or different procedures for handling the seismic signals each according to the invention.

FIG. 5 illustrates a preferred manner of handling the signals from corresponding pairs of detectors in accordance with the invention as described above. Thus, the signal energies developed by a detector 63 will be fed to a delay line 64 and then will be introduced to a subtractor element 65. The detector 63 corresponds to detector 27 of the preceding explanation, and so the amount of time delay is determined as was indicated and described, i.e., as represented by the time lag 45 in FIG. 3. At the same time, the signal developed by a detector 68, which is vertically spaced beneath detector 63 and corresponds to detector 26, will be directly introduced to the subtractor 65, and the resulting algebraically combined signal will be fed from subtractor 65 into a recorder 71. This method of handling the data will directly produce a seismic record by means of the recorder 71 that has automatically minimized or eliminated downgoing energies from the record so that the result is much easier to interpret.

Figure 6:
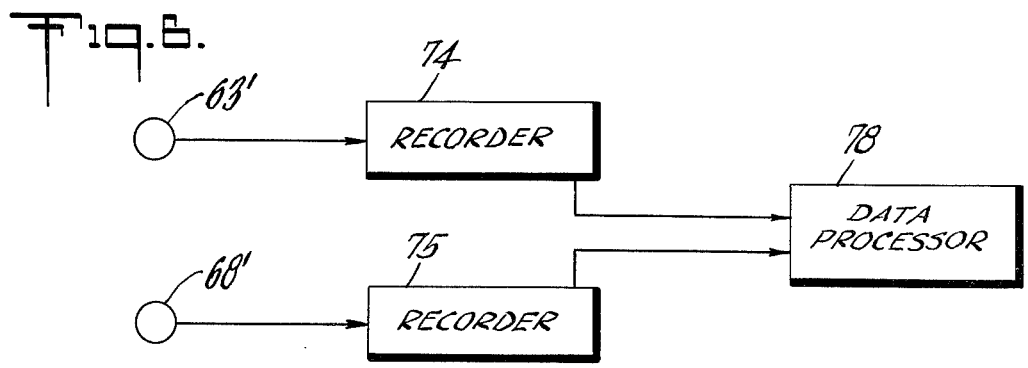

FIG. 6 illustrates another manner of carrying out the invention. This involves the use of a data processor. However, the same plural spreads spaced vertically apart in the water would be used. Consequently, the corresponding pairs of detectors would supply the signal energies, and they would be fed over electrical circuits as before, so that corresponding reference numbers with prime marks are used to designate the detectors. Thus, signals from a detector 63' would be directly recorded by a recorder 74, while the signals from the other corresponding detector 68' would be recorded by another recorder 75. Then, using modern techniques, the signals from each of the recorders 74 and 75 would be fed to a data processor 78 where the signals would be combined to carry out the same delay and subtraction as described with respect to the FIG. 5 arrangement.

It will be noted that in each case the invention involves the use of two detector spreads vertically spaced apart in the body of water while a survey is being made. The resulting final record provides substantial elimination of interference patterns that are caused by downward reflection of seismic energies from the surface of the body of water. However, the FIG. 5 method has the advantage of producing recorded data that is free of downgoing signals, and the expense and time of data processing at a later date is avoided. Also, when properly carried out, the resulting data from the FIG. 5 method should be free of human errors which at times are introduced in the processing of data through computers.

While preferred embodiments of the invention have been described above in considerable detail in accordance with the applicable statutes, this is not to be taken as in any way limiting the invention, but merely as being descriptive thereof.

I claim:

1. In marine reflection-type seismic exploration a method for improving the character of recorded data developed from seismic detectors located in a body of water, comprising creating downward-travelling seismic energy in said body of water, locating two of said detectors spaced vertically apart in said body of water, delaying all of the signals from one of said two detectors in order to have the signals created by undesired vertical-going energy which is reflected from a boundary of said body of water delayed into time coincidence with the corresponding vertical-going energy signals from the other detector, and subtracting all the signals both desired and undesired from said one of said spaced detectors from all of the corresponding signals from said other detector after said delay whereby said desired signals are also subtracted not added in order to directly cancel only the undesired vertical-going energy signals.

2. A method according to claim 1, wherein said step of locating includes a plurality of detectors at one depth and a corresponding plurality of detectors at another depth beneath the surface in said body of water.

3. A method according to claim 2, wherein said plurality of detectors are spaced horizontally apart to extend over a predetermined range from the location of said source of seismic energy.

4. In marine reflection-type seismic exploration, a method for improving the character of recorded data developed from seismic detectors located in a body of water, comprising creating downward-travelling seismic energy in said body of water, locating two of said detectors spaced vertically apart in said body of water at a predetermined range from said source, reproducibly recording the seismic energy received at each of said two detectors separately, delaying the seismic energy reproduced from the uppermost of said two detectors relative to the corresponding energy reproduced from the lowermost an amount sufficient to adjust only the unwanted downgoing energies from both into time coincidence, and subtracting all of said delayed reproduced energy from said other reproduced energy in order to directly cancel out only said unwanted downgoing energies without adding the wanted energies.

* * * * *